Oct. 21, 1930. L. D. SOUBIER 1,778,735
MEANS FOR MAKING BLOWN GLASS ARTICLES
Original Filed Sept. 20, 1924 5 Sheets-Sheet 3
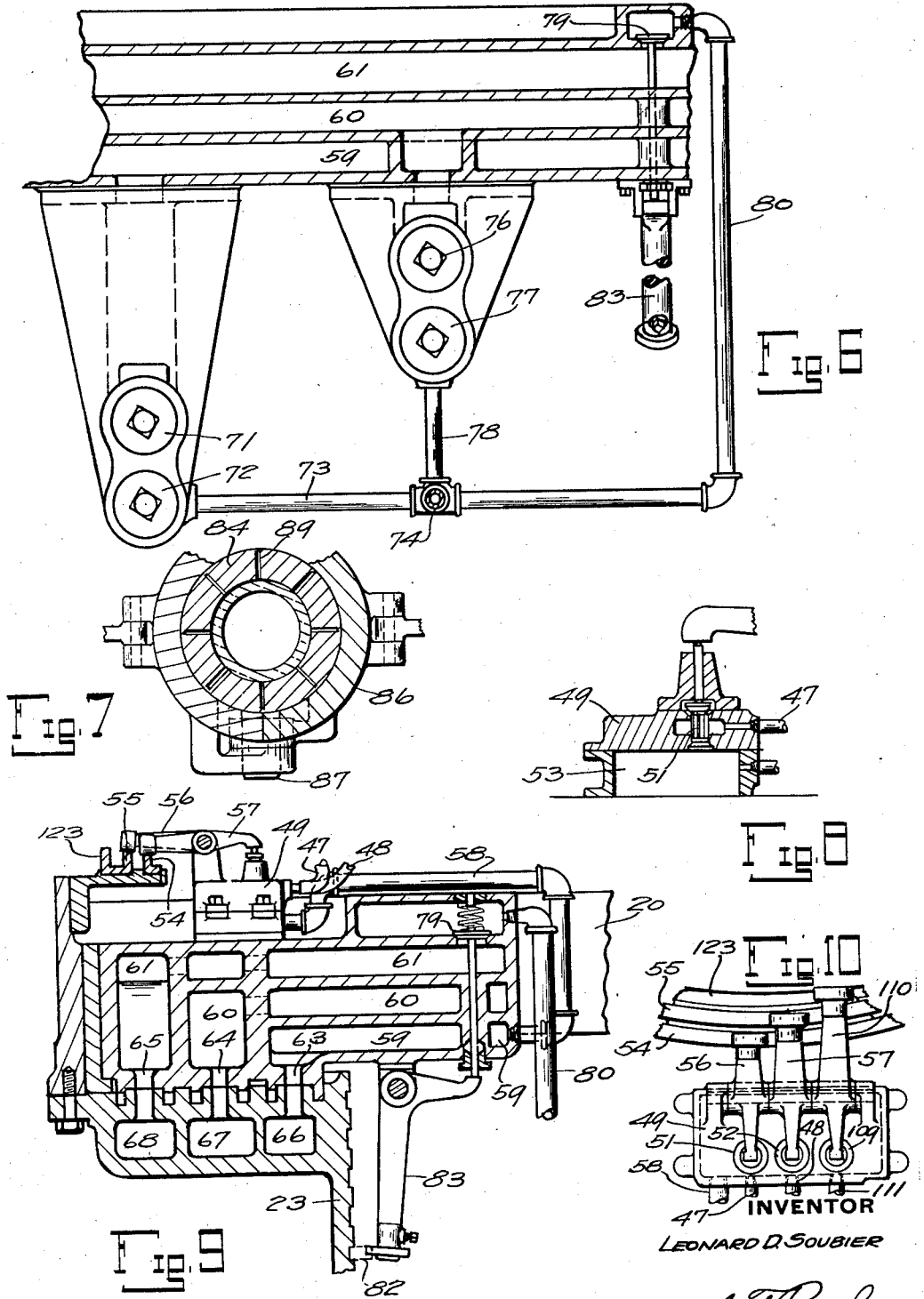

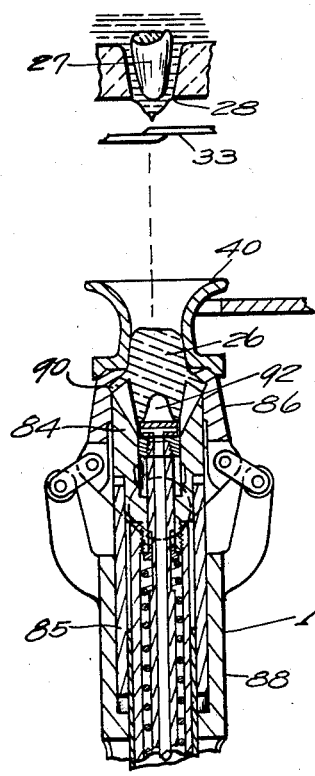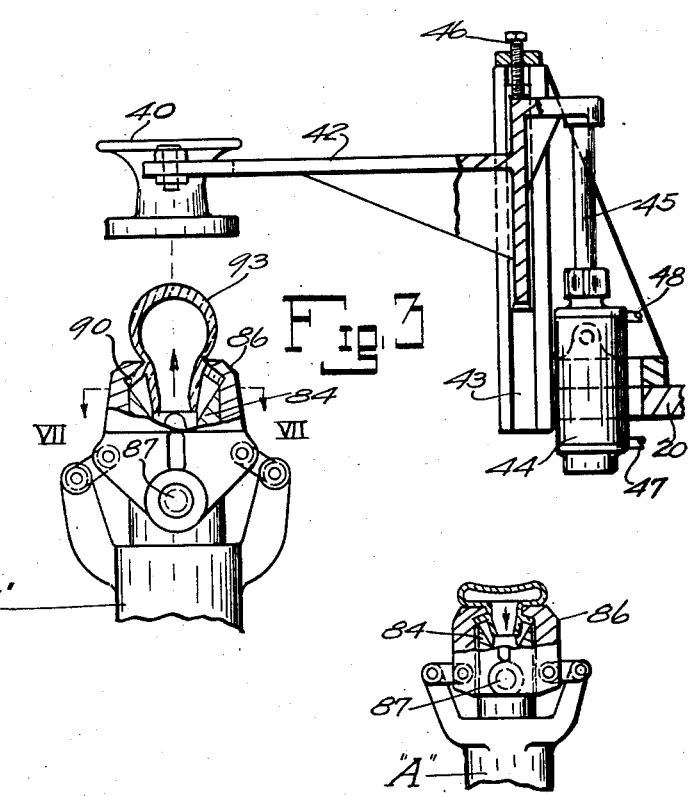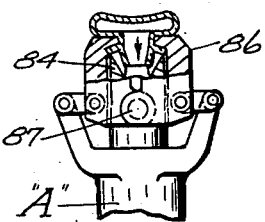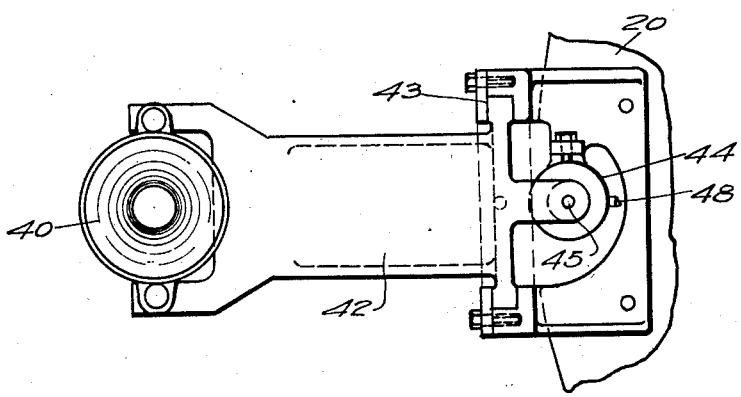

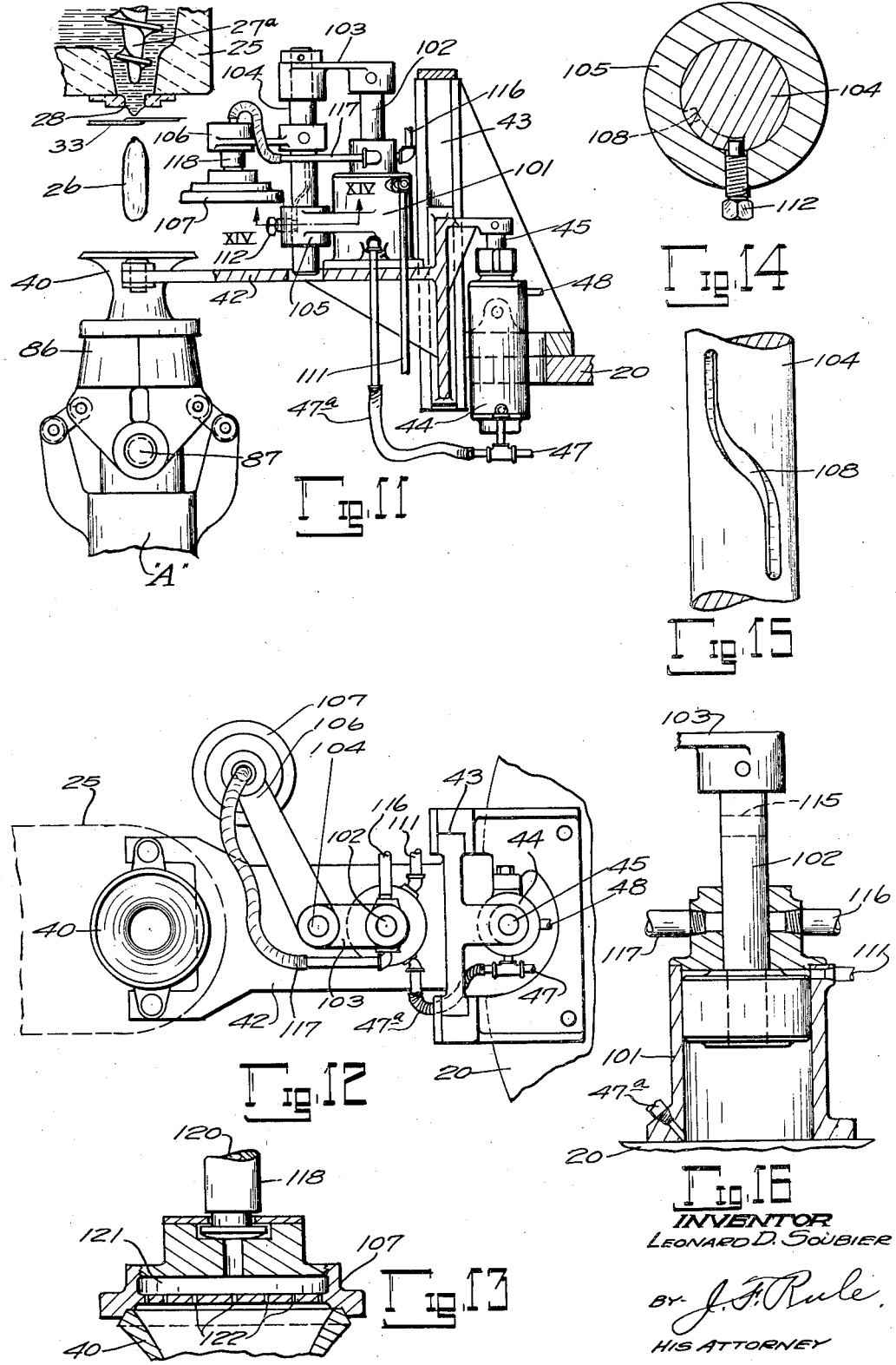

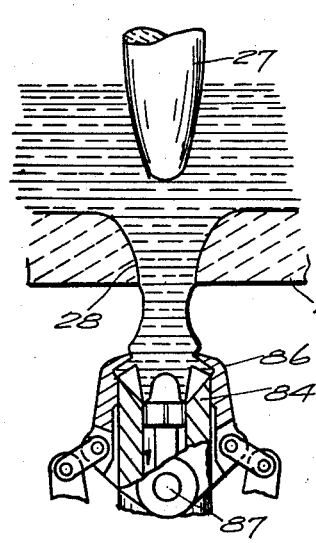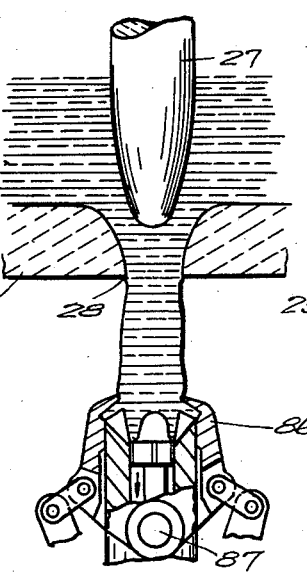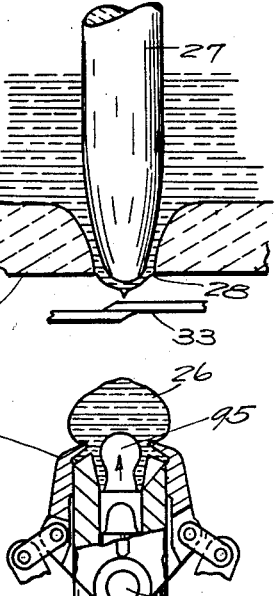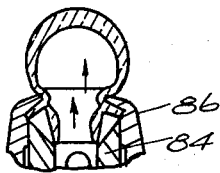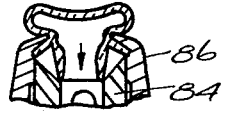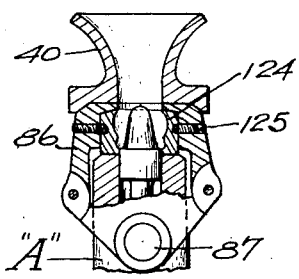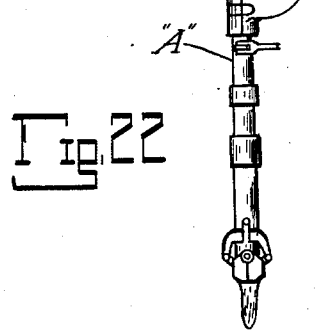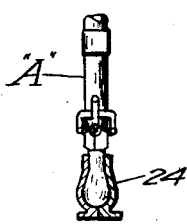

Patented Oct. 21, 1930

1,778,735

UNITED STATES PATENT OFFICE

LEONARD D. SOUBIER, OF TOLEDO, OHIO, ASSIGNOR TO OWENS-ILLINOIS GLASS COMPANY, OF TOLEDO, OHIO, A CORPORATION OF OHIO

MEANS FOR MAKING BLOWN-GLASS ARTICLES

Application filed September 20, 1924, Serial No. 738,761. Renewed April 22, 1929.

My invention relates to a machine for making electric lamp bulbs or other blown glass articles, and particularly to a machine for making blown glass ware, wherein thin walls are a requisite, or where a paste mold finish is desired.

The invention is herein shown as embodied in a bulb-making machine which is a modification of the machine disclosed in the United States patent to Kadow, No. 1,248,664, December 4, 1917. Bulb-making machines of the type shown in this Kadow patent are provided with heads carried on a rotating carriage, each of which heads is provided with a suction gathering mold arranged to dip into a tank of molten glass and gather a charge of glass by suction. The charges are given a predetermined shape in the gathering molds and then dropped upon spindles on the carriage for further manipulation.

An object of my invention is to provide a machine in which this preformation of the charges of glass in molds before being received by the spindles, is unnecessary.

A further object of the invention is to provide means for segregating from the supply of molten glass, individual masses or charges and transferring them to the spindles independently of any mechanism on the spindle carriage. The present invention eliminates the complicated and expensive mechanism at present in use with the Kadow type of machine, for gathering and forming the blank before depositing it on the spindle.

A further object of the invention is to provide practical means for supplying the spindles with charges of glass directly from a gravity type of feeder in which the glass issues from an outlet in the bottom of a container, thereby eliminating suction gathering mechanism.

In the accompanying drawings:

Figure 2 is a sectional view of the upper portion of the spindle, the retainer or guide by which a gob of glass is guided and held in position on the spindle, and the gob feeder.

Figure 3 shows the guide with its operating motor, and the spindle with the parison blown to hollow form.

Figure 4 shows the spindle with the parison collapsed by exhausting the air therefrom.

Figure 5 is a top plan view of the guide shown in Figure 3.

Figure 6 is a fragmentary view of the chambers for vacuum, low pressure and high pressure, and various valves and pipe connections.

Figure 7 is a sectional view of the spindle at the line VII—VII on Figure 3.

Figure 8 is a section showing one of the valves of Figure 10.

Figure 9 is a fragmentary view showing the air and vacuum distributing head, air and vacuum chambers, and various valves.

Figure 10 is a plan view of valves and their cams controlling the air supply to the motor shown in Figure 3.

Figures 11 to 16 illustrate a modification in which a blowhead is used for seating the glass in the spindle in place of using vacuum.

Figure 11 shows a spindle with a retainer in position to receive a charge of glass, and the blowhead in inoperative position.

Figure 12 is a plan view of the mechanism shown in Figure 11.

Figure 13 is a part sectional elevation showing the blowhead in operative position.

Figure 14 is a section at the line XIV—XIV on Figure 11, showing the cam which controls the blowhead.

Figure 15 is an elevation view of the blowhead cam.

Figure 16 is a sectional elevation of the blowhead controlling motor.

Figures 17 to 23 illustrate a modification in which the glass engages the spindle before it is severed, and show successive steps in the formation of the blank.

Figure 17 shows the upper end of the spindle in its elevated position with the blank holder engaging the issuing glass and the gripping jaws closed on the glass.

Figure 18 shows the spindle moved downward to an intermediate position before the charge is severed.

Figure 19 shows the charge or blank severed, the spindle moved farther down, the plunger withdrawn and an initial blowing of the blank.

Figure 20 shows a further expansion of the blank.

Figure 21 shows the blank collapsed by applying suction therein.

Figure 22 is a view of the spindle in its inverted position.

Figure 23 is a detail showing a blank in a finishing mold.

Figure 24 is a view showing a neck forming thimble mounted upon the spindle.

Figure 1:
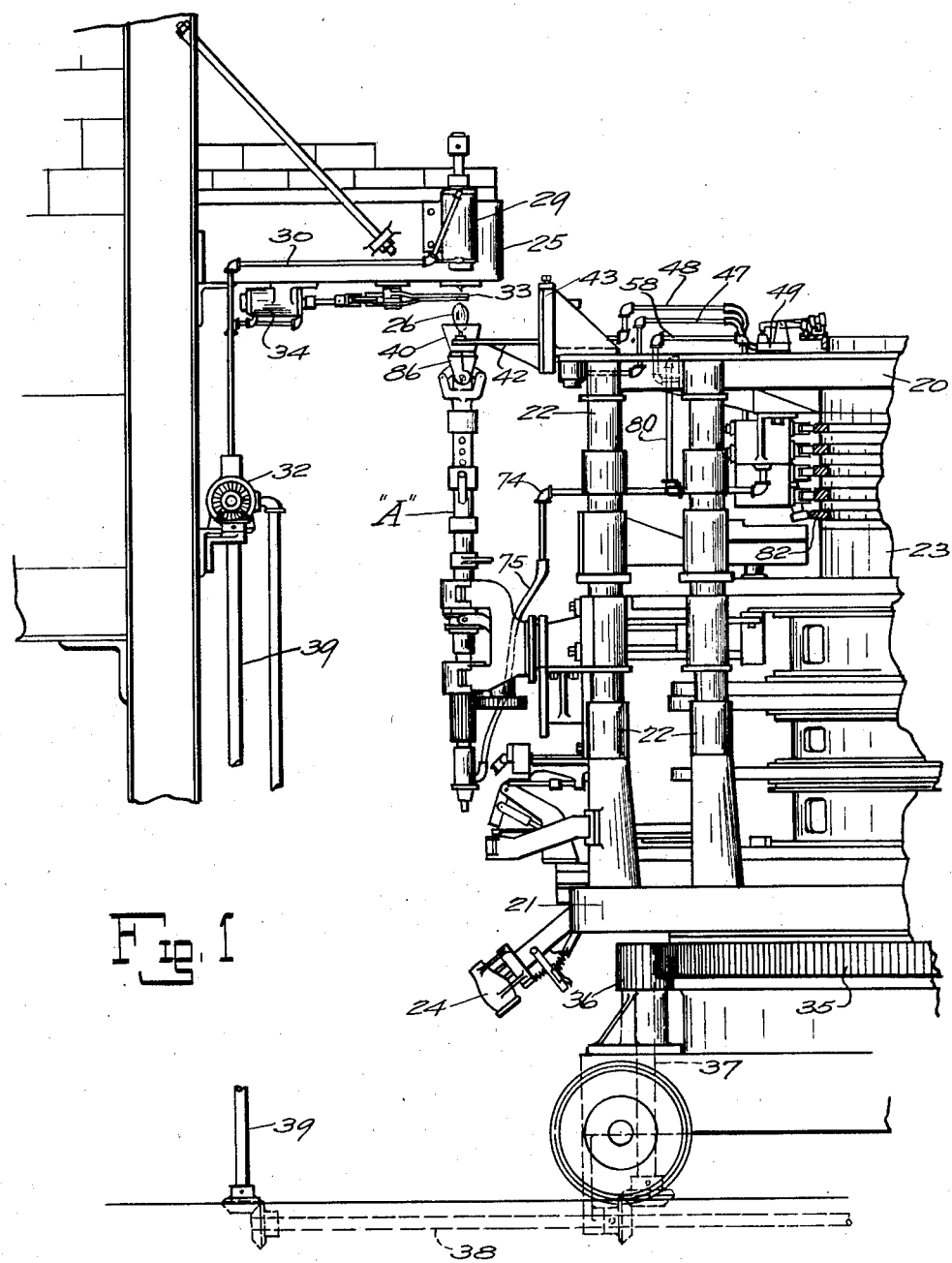
Figure 1 is an elevation with parts broken away, of a machine constructed in accordance with my invention.

The machine herein shown comprises a plurality of glass forming units arranged upon a carriage or framework consisting of an upper spider 20 and a lower spider 21 and connecting columns 22. The carriage is rotatable around a stationary drum 23. Each unit comprises a spindle A which is designed to receive a gob or blank of glass, means for supplying suction through the spindle for attaching the blank to the spindle and effecting various operations on the blank, means for introducing compressed air into the blank through the spindle, a mold 24 in which the article is finished, and valves and other mechanisms controlled by cams on the stationary drum for operating the spindle and effecting the operations on the glass required for the production of the finished articles.

As the machine carriage rotates, the spindles A are brought in succession to a charge receiving position beneath a gob feeder, from which a gob 26 of glass is dropped on the spindle. The gob feeder may be of any approved construction, and as herein shown, comprises a regulating plug 27 (Fig. 2) which is periodically reciprocated vertically over the outlet opening 28 in the forehearth or boot 25 of the furnace tank. The plug 27 is actuated by an air motor 29 (Fig. 1) having pipe connections 30 with a timer 32. The gobs 26 are severed by a pair of shears 33, operated by an air motor 34 also connected to the timer. The timer is driven from the carriage through connections comprising gears 35, 36 and shafts 37, 38, 39, whereby the operations of the motors 29 and 34 are synchronized with the movements of the machine, and so timed that a gob is severed and dropped onto each spindle as it reaches a position beneath the feeder.

Each gob as it drops, is directed onto the spindle by a funnel shaped guide 40 which at this moment is seated on the end of the spindle, there being a guide for each spindle.

The guide 40 also serves as a retainer and former by which the gob is held in position and its shape controlled until the initial blowing has commenced. The guide 40 is carried on a bracket arm 42 mounted for vertical movement in guides 43 on the machine carriage, and actuated by an air motor 44 having a piston rod 45 connected to the bracket arm. The upward movement of the formed guide may be limited by an adjustable stop 46.

The air motor 44 is operated by compressed air supplied through pipes 47 and 48 leading thereto from a valve chest 49. (See Figs. 8, 9, 10.) Valves 51 and 52 in said chest control communication between said pipes and an air pressure chamber 53. The valves are actuated by stationary cams 54 and 55, operating through levers 56 and 57 respectively, the cams being shaped to effect lifting and lowering of the guides 40 at the times and in the manner hereinafter set forth.

The chamber 53 is in communication through a pipe 58 with a high pressure air chamber 59 formed in the upper member 20 of the carriage. A low pressure chamber 60, and a vacuum chamber 61, are also formed in the frame member 20. The chambers 59, 60 and 61 are in constant communication (see Fig. 9) through ports 63, 64 and 65 respectively, with a high pressure chamber 66, a low pressure chamber 67 and a vacuum chamber 68, the last three mentioned chambers being formed in the drum 23.

The construction and arrangement of the air and vacuum chambers mentioned in the preceding paragraph, the pipe connections therefrom to the spindles A, and the valves controlling the air supply to the spindles, may be similar to the corresponding parts in the patent to Kadow, No. 1,195,588, August 22, 1916. Valves 71 and 72 (Fig. 6) control the supply of air from the high pressure chamber 59 through pipes 73, 74 and flexible hose 75 to the spindle. Valves 76 and 77 control the supply of air from the low pressure chamber 60 through pipe line 78, 74, 75 to the spindle. A valve 79 when opened, establishes communication from the vacuum chamber 61 through pipe line 80, 74, 75 to the spindle. The valve 79 is actuated (see Fig. 9) by a stationary cam 82 operating through a bell crank lever 83.

The construction and operation of the spindles A are, in the main, like those fully set forth in the Kadow Patent No. 1,248,664, hereinbefore mentioned. In the present invention, the upper or gob receiving end of the spindle is specially designed for holding and shaping the glass by either suction of air under pressure, and the operation of attaching a charge of glass to the spindle and giving it its initial formation, is materially different from the disclosure in the Kadow patent.

The spindle is provided at its upper end with a blank holder 84, (Figs. 2, 3 and 7), which is mounted for a limited vertical movement in the end of the spindle casing 85. A pair of jaws 86 are pivoted at 87 and operated by a sleeve 88 slidable on the casing 85. When the spindle is in position to receive a change of glass 26, the jaws are in closed position and the guide 40 is seated thereon, as shown in Figure 2. As the gob or unformed mass of glass drops through the guide, suction is applied through the hollow spindle, and serves to firmly attach the gob to the spindle. Radial slots 89 in the upper end of the holder 84 permit the air to be exhausted from the annular space provided between the end of the holder and the jaws 86, so that the glass enters said space and forms an annular flanged portion 90 on the blank.

The guide 40 not only directs the gob onto the spindle, but acts as a temporary retainer for the glass, preventing it from spreading out over the jaws 86 and controlling its shape. The guide may also serve to hold the jaws firmly closed. At this time, the plunger tip 92 is in its raised position and forms an initial blow opening in the glass.

The vacuum is now cut off, the plunger withdrawn, and a puff of air applied through the spindle to expand the glass and form a hollow parison 93 (Fig. 3). During this blowing operation, or just previous thereto, the guide 40 is raised to the Figure 3 position. By raising the guide 40 as the blow-up takes place, the initial shape to which the blank is inflated is controlled. The parison is next collapsed (Fig. 4) by exhausting the air through the spindle, after which the spindle is swung downward toward a horizontal position and the parison again expanded. These, and the operations following, by which the formation of the lamp bulb or other article is complete,—may be the same as those set forth in the Kadow patents heretofore mentioned.

Figures 11 to 16 inclusive, illustrate a modified form of mechanism which allows the charges of molten glass to be deposited upon the spindle and attached thereto without the use of vacuum. The regulator 27$^a$, as here shown, is in the form of a screw plug that may be either rotated or reciprocated vertically, or both, to control the discharge. Mounted upon the bracket arm 42 is an air motor 101 having attached to its piston 102, an arm 103 carrying a guide rod 104. This guide rod is adapted for free turning movement in the arm 103 and in a bearing extension 105 of the air motor 101. Rigidly secured to the guide rod is a supporting arm 106 carrying at its outer end a blowhead 107 arranged to cooperate with the retainer member 40. A cam slot 108 formed in the guide rod 104 is so shaped as to swing the blow head into and out of operative position when actuated by the air motor 101.

With the parts in the position shown in Figure 11, the valve 52 (Fig. 10) is open, allowing air to pass through the pipe 48 to the motor 44, holding the retainer 40 seated upon the spindle A. Valve 109 will next be actuated by a stationary cam 123, through lever 110, allowing air to pass through pipe 111 to the upper end of the motor 101, moving the piston downward, and thereby lowering the blowhead 107 and guide rod 104. A pin 112 mounted in the bearing 105, projects into the cam slot 108 and acts during this downward movement to swing the blowhead laterally into position above and in alignment with the retainer 40, and then guide the blowhead vertically downward into engagement with the retainer. As the piston 102 reaches its lowermost position, an opening 115 extending through the piston is brought into alignment with a pipe 116 carrying air under pressure, and functions as a valve, allowing air to pass from the pipe 116 to a pipe 117 leading to the blowhead stem 118. This air passes through an opening 120 (Fig. 13) in said stem to a chamber 121 in the blowhead, thence through openings 122 to force the glass down upon the spindle. The valve 51 will next be actuated by the cam 54 to allow air to pass through lines 47 and 47$^a$ which leads to the lower end of motors 101 and 44, moving both pistons upward simultaneously. The moment the piston 102 starts upward, the air to the blowhead 107 is discontinued automatically. The cams 54, 55 and 123 are so shaped as to actuate their respective valves in the proper sequence and for the proper length of time.

Referring to Figure 24, a spindle A is shown carrying at its upper end a neck forming thimble 124 arranged to form a bottle neck upon one end of a charge of glass, thereby adapting the machine for making bottles or other hollow ware with finished necks. This thimble is formed the same as in an ordinary bottle forming machine, i. e., in two separable halves, these halves being attached to the jaws 86 by screws 125. This form of spindle may be used either with vacuum or air under pressure.

Figures 17 to 21 illustrate a method of operation in which the charge of glass is connected to the spindle before being severed from the source of supply. The spindle is brought comparatively close to the outlet 28 (Fig. 17) and the glass descends into engagement with the holder 84. The air is now exhausted through the spindle and shapes the charge in the manner heretofore described in connection with Figure 2.

The spindle is moved vertically downward as soon as the glass has been attached thereto, the issuing glass being drawn out, as shown in Figure 18. The shears 33 operate during this downward movement of the spindle, to sever the glass, leaving the charge 26 attached to the spindle. Also, during this downward movement of the spindle, the plunger tip is withdrawn and air pressure supplied to exand the glass. The incipient expansion of the glass is indicated at 95 (Fig. 19). The blowing is continued until the parison assumes the hollow form shown in Figure 20, after which the air is exhausted to collapse the glass (Fig. 21).

Modifications may be resorted to within the spirit and scope of my invention.

What I claim is:

1. In apparatus for forming hollow glass articles, the combination of a receiver to which unmolded charges of glass are periodically delivered, a funnel shaped guide positioned and arranged to direct the glass charges to said receiver, suction means for attaching the glass charges to the receiver, said guide forming a means to control the shape of each charge of glass after it has reached the receiver, means to withdraw the guide vertically away from the receiver, and means to blow the glass charge to hollow form during withdrawal of the guide, initial blowing of the glass charge being effected while the latter is in contact with the guide.

2. In combination, means to deliver charges of molten glass, a receiver and charge guide cooperating with said receiver to direct a charge of glass thereto, means to attach the charge to the receiver, means to move the guide into and out of cooperative relation with the receiver, and means to blow the charge to form a blank during movement of the guide away from the receiver whereby said guide assists in controlling the shape and extent to which the blank is blown.

3. In apparatus for forming hollow glass articles, the combination of a spindle adapted to periodically receive unmolded charges of molten glass, a charge guide cooperating with said spindle to direct a charge thereto, combined mechanical and pneumatic means to attach each charge to the spindle, means to move the guide into and out of cooperative relation to the spindle, and means to blow each charge to form a blank during movement of the guide away from the spindle and prior to movement of the guide entirely out of contact with the charge.

4. In apparatus for forming hollow glass articles, the combination of a spindle adapted to periodically receive unmolded charges of molten glass, pivoted jaws cooperating with the spindle to grip portions of the glass, pneumatic means to direct said portions to a point to be gripped by the jaws, a funnel guide movable into and out of cooperative relation to the spindle and jaws, and means to blow the glass to form a blank during movement of said guide away from the spindle and jaws.

5. In apparatus for forming hollow glass articles, the combination of a spindle adapted to periodically receive unmolded charges of molten glass, pivoted jaws cooperating with the spindle to grip portions of the glass, pneumatic means to direct said portions to a point to be gripped by the jaws, and a funnel guide movable into and out of cooperative relation to the spindle and jaws, said pneumatic means also operable to blow the glass to form a blank during movement of the guide away from the spindle and jaws and prior to movement of the guide entirely out of contact with the glass.

6. Glass working apparatus comprising a neck mold movable to and from a position below the discharge outlet of a glass container, a funnel for directing glass delivered from the outlet into said neck mold and for affording lateral support for the glass above the neck mold, means for causing a suction on the glass in the neck mold to aid in forming the neck portion of an article of glassware while glass for the body of such article is laterally supported by said funnel, means for removing the funnel from the glass when the neck portion of the article has been formed, leaving the bare glass for the body of the article protruding from the neck mold, and means for applying blowing pressure through said neck portion into the bare glass.

7. The combination of a neck mold, means for moving it to and from a position beneath the discharge outlet of a glass container, a funnel between said outlet and neck mold when the latter is in said position, said funnel arranged to direct glass delivered from the outlet into the mold, means for causing a suction on the glass in the mold to aid in forming the neck portion of an article of glassware, said funnel being of a size and in a position to laterally support the glass during said application of suction, means for removing the funnel from the glass when the neck portion of the article has been formed, leaving the bare glass for the body of the article protruding from the neck mold, and means for applying air under pressure through the neck portion of the article after the funnel is removed and thereby expanding the bare glass.

8. Glass working apparatus comprising a neck mold movable to and from a position below the discharge outlet of a glass container, a funnel extending upward from the neck mold for directing glass delivered from the outlet into said neck mold and for affording lateral support for the glass above the neck mold, means for causing a suction on the glass in the neck mold to aid in forming the neck portion of an article of glassware while glass for the body of such article is laterally supported by said funnel, means for removing the funnel from the glass by a relative movement of the funnel and neck mold in a direction lengthwise of the axis of the funnel, when the neck portion of the article has been formed, leaving the bare glass for the body of the article protruding from the neck mold, and means for applying blowing pressure through said neck portion into the bare glass.

9. The combination of a neck mold, means for moving it to and from a position beneath the discharge outlet of a glass container, a funnel seated on the neck mold when the latter is in said position, said funnel arranged to direct glass delivered from the outlet into the mold, means for causing a suction on the glass in the mold to aid in forming the neck portion of an article of glassware, said funnel being of a size and in a position to laterally support the glass during said application of suction, means for removing the funnel from the glass by a relative movement of the funnel and neck mold in a direction lengthwise of the axis of the funnel, when the neck portion of the article has been formed, leaving the bare glass for the body of the article protruding from the neck mold, and means for applying air under pressure through the neck portion of the article after the funnel is removed and thereby expanding the bare glass.

Signed at Toledo, in the county of Lucas and State of Ohio, this 16th day of September, 1924.

LEONARD D. SOUBIER.